(12) United States Patent
Saito et al.

(10) Patent No.: US 8,685,177 B2
(45) Date of Patent: Apr. 1, 2014

(54) MANUFACTURING METHOD FOR A CRANKSHAFT MEMBER

(75) Inventors: Isamu Saito, Saitama-ken (JP); Yoshihiro Takitani, Saitama-ken (JP); Shinichiro Kato, Nagoya (JP); Makoto Hobo, Nagoya (JP); Keiichiro Kamiya, Nagoya (JP); Takahiro Miyazaki, Nagoya (JP); Takashi Kano, Tokyo (JP)

(73) Assignees: Honda Motor Co., Ltd., Tokyo (JP); Daido Steel Co., Ltd., Aichi (JP)

( * ) Notice: Subject to any disclaimer, the term of this patent is extended or adjusted under 35 U.S.C. 154(b) by 499 days.

(21) Appl. No.: 12/630,536

(22) Filed: Dec. 3, 2009

(65) Prior Publication Data
US 2010/0139451 A1     Jun. 10, 2010

(30) Foreign Application Priority Data
Dec. 9, 2008    (JP) ................................. 2008-313698

(51) Int. Cl.
C21D 8/00    (2006.01)
C21D 9/30    (2006.01)
C23C 8/26    (2006.01)

(52) U.S. Cl.
USPC ........... 148/230; 148/318; 148/228; 148/231; 148/649; 148/904

(58) Field of Classification Search
USPC .......... 148/318, 228, 230, 231, 232, 649, 904
See application file for complete search history.

(56) References Cited

FOREIGN PATENT DOCUMENTS

| | | | |
|---|---|---|---|
| JP | 356156717 A | * | 12/1981 |
| JP | 2001-254143 | | 9/2001 |
| JP | 2007-197812 | | 8/2007 |

OTHER PUBLICATIONS

Machine-English translation of Japanese patent 2007-197812, Asai Tetsuya et al., Aug. 9, 2007.*

* cited by examiner

*Primary Examiner* — Deborah Yee
(74) *Attorney, Agent, or Firm* — Birch, Stewart, Kolasch & Birch, LLP (57) ABSTRACT

The invention relates to a crankshaft member having high fatigue strength and good bending correctability, and its method of manufacture. The steel made crankshaft member mainly consists of a two-phase structure of ferrite and perlite. The steel includes C, Ni, Mn, and Cr as required elements and Si, Cu, Mo, Ti, V, Nb, Ca, and S as optional elements that may be included, in the amounts of C within the range of 0.20 to 0.50 wt %, Si within the range of 0 to 0.6 wt %, Mn within the range of 0.5 to 1.5 wt %, Cu within the range of 0 to 0.7 wt %, Ni within the range of 0.05 to 1.5 wt %, Cr within the range of 0.05 to 0.45 wt %, and Mo within the range of 0 to 0.5 wt % to satisfy the condition $115 \geq 70C+8Si+23Mn+11Cu+128Cr+83Mo \geq 50$. A portion of the member surface is provided at least with a hard nitride layer having an average hardness within the range of 300 to 450 HV. Lamellar spacing of the perlite is 0.3 μm or less.

9 Claims, 7 Drawing Sheets

Fig. 1

| | C | Si | Mn | P | S | Cu | Ni | Cr | Mo | Ti | V | Nb | Ca | O | F value | Remark |
|---|---|---|---|---|---|---|---|---|---|---|---|---|---|---|---|---|
| Test piece 1 | 0.25 | 0.10 | 0.75 | 0.021 | 0.048 | 0.15 | 0.15 | 0.15 | 0.02 | - | - | | - | 0.0023 | 58 | |
| Test piece 2 | 0.35 | 0.13 | 0.85 | 0.025 | 0.050 | 0.20 | 0.18 | 0.21 | 0.05 | - | - | | - | 0.0035 | 78 | |
| Test piece 3 | 0.41 | 0.22 | 0.80 | 0.022 | 0.055 | 0.35 | 0.35 | 0.30 | 0.00 | - | - | | - | 0.0020 | 91 | |
| Test piece 4 | 0.50 | 0.09 | 1.15 | 0.013 | 0.051 | 0.25 | 0.20 | 0.25 | 0.06 | - | - | | - | 0.0031 | 102 | |
| Test piece 5 | 0.31 | 0.45 | 0.78 | 0.016 | 0.045 | 0.44 | 1.10 | 0.21 | 0.00 | - | - | | - | 0.0019 | 75 | |
| Test piece 6 | 0.33 | 0.10 | 1.45 | 0.018 | 0.100 | 0.10 | 0.50 | 0.14 | 0.01 | - | - | | - | 0.0023 | 77 | |
| Test piece 7 | 0.30 | 0.21 | 0.87 | 0.024 | 0.060 | 0.45 | 0.70 | 0.11 | 0.13 | - | - | | - | 0.0025 | 73 | |
| Test piece 8 | 0.33 | 0.12 | 0.88 | 0.019 | 0.045 | 0.17 | 0.45 | 0.21 | 0.05 | 0.02 | - | | 0.0035 | 0.0070 | 77 | |
| Test piece 9 | 0.31 | 0.14 | 0.86 | 0.020 | 0.050 | 0.20 | 0.65 | 0.18 | 0.03 | - | 0.02 | | - | 0.0026 | 70 | |
| Test piece 10 | 0.29 | 0.14 | 0.85 | 0.020 | 0.510 | 0.22 | 0.55 | 0.10 | 0.04 | 0.03 | 0.02 | 0.02 | 0.0030 | 0.0075 | 60 | |
| Test piece 11 | 0.15* | 0.15 | 0.55 | 0.018 | 0.045 | 0.15 | 0.10 | 0.04 | 0.02 | - | - | | - | 0.0019 | 33 | |
| Test piece 12 | 0.51* | 0.08 | 0.75 | 0.013 | 0.051 | 0.25 | 0.20 | 0.45 | 0.04 | - | - | | - | 0.0025 | 117 | |
| Test piece 13 | 0.33 | 0.25 | 0.80 | 0.020 | 0.060 | 1.10* | 0.18 | 0.15 | 0.07 | - | - | | - | 0.0021 | 81 | ** |
| Test piece 14 | 0.32 | 0.18 | 0.80 | 0.020 | 0.060 | 0.23 | 0.18 | 0.65* | 0.07 | - | - | | - | 0.0021 | 134 | |

*: Out of the conditions specified in the present invention.

**: Cracks ocuurred during the forging process

| | Cooling rate V (°C/s) | Metal structure | F value | Hardness H (HV) | Lamellar spacing $\lambda$ ($\mu$m) | Fatigue strength U (MPa) | Bending correctability d (mm) |
|---|---|---|---|---|---|---|---|
| Test piece 1 | 1.0 | F+P | 58 | 320 | 0.25 | 420 | 12.31 |
| Test piece 2 | 1.1 | F+P | 78 | 371 | 0.24 | 462 | 8.42 |
| Test piece 3 | 0.9 | F+P | 91 | 400 | 0.23 | 491 | 6.22 |
| Test piece 4 | 0.9 | F+P | 102 | 421 | 0.22 | 511 | 6.05 |
| Test piece 5 | 1.0 | F+P | 75 | 373 | 0.23 | 466 | 10.31 |
| Test piece 6 | 1.0 | F+P | 77 | 369 | 0.23 | 473 | 8.57 |
| Test piece 7 | 0.9 | F+P | 73 | 355 | 0.24 | 455 | 9.63 |
| Test piece 8 | 1.1 | F+P | 77 | 371 | 0.24 | 470 | 9.35 |
| Test piece 9 | 1.0 | F+P | 70 | 353 | 0.24 | 453 | 9.78 |
| Test piece 10 | 1.0 | F+P | 60 | 327 | 0.24 | 429 | 11.75 |
| Test piece 11 | 0.9 | F+P | 33 | 266 | 0.26 | 352* | 15.73 |
| Test piece 12 | 0.9 | F+P | 117 | 459 | 0.23 | 552 | 1.75* |
| Test piece 14 | 1.0 | F+P | 134 | 499 | 0.23 | 589 | 1.00* |

\*: Out of the conditions specified in the embodiment of the present invention.

|  | Cooling rate V (°C/s) | Metal structure | F value | Hardness H (HV) | Lamellar spacing λ (μm) | Fatigue strength U (MPa) | Bending correctability d (mm) | Remark |
|---|---|---|---|---|---|---|---|---|
| Test piece 2-1 | 0.4 | F+P | 78 | 363 | 0.3 | 463 | 7.18 | |
| Test piece 2-2 | 1.1 | F+P | 78 | 371 | 0.24 | 470 | 8.42 | |
| Test piece 2-3 | 9.6 | F+P | 78 | 377 | 0.1 | 476 | 12.11 | |
| Test piece 2-4 | 18.4 | F+P | 78 | 385 | 0.06 | 483 | 12.75 | |
| Test piece 2-5 | 0.2 | F+P | 78 | 351 | 0.35 | 452 | 5.89* | |
| Test piece 2-6 | 25.0 | F+P+B | 78 | 399 | — | — | — | *** |

*: Out of the conditions specified in the embodiment of the present invention.

***: A bainite structure was observed.

MANUFACTURING METHOD FOR A CRANKSHAFT MEMBER

BACKGROUND OF THE INVENTION

1. Field of the Invention

The present invention relates to a crankshaft member and manufacturing method thereof, and more particularly to a crankshaft member having high fatigue strength and its method of manufacture.

2. Description of the Background Art

In a reciprocating engine of an automobile or the like, a crankshaft is used to convert the up-and-down motion of a piston into a rotating motion. The crankshaft comprises a journal portion that rotates around a rotating shaft, an arm portion provided at a predetermined interval along the rotating shaft and formed protruding sideways, and a pin portion of the protruding end portion of the arm portion that is connected via a pin to a connecting rod that connects with a piston. The up-and-down motion of the piston rotates the arm portion around the rotating shaft via the connecting rod, and is converted into a rotating motion. The rotating motion can then be extracted from the journal portion.

This crankshaft, comprising such portions, is integrally formed by hot forging the steel rod into the required shape, for example. Subsequently, as required, a normalizing process is carried out, removing residual stress, and surface hardening process such as a soft-nitriding or nitriding process is carried out, improving fatigue strength. During the forging or the surface hardening process, the crankshaft member is likely to bend or warp. Therefore, subsequently, a bending correction process is carried out to correct bending, warping, and the like.

Now, in general, through the bending correction process, any bends or warps is corrected by bending the crankshaft member in the direction opposite the direction of the bend. At this time, particularly on a crankshaft member that has been subjected to a surface hardening process, such as a soft-nitriding or nitriding process, cracks readily occur on the hardened surface as a result of the bending. These cracks may cause damage to the crankshaft.

JP2001-254143A discloses a crankshaft member made of a micro-alloyed steel consisting of a two-phase structure of ferrite and perlite with a decreased perlite grain size, that decreases crack occurrence in the hardened layer during the bending correction process. This document states that crack occurrence can be decreased in the hardened layer by reducing the size of the perlite grain since cracks in the hardened layer grow in units of perlite grains. On the other hand, when the perlite grain size in the two-phase structure of ferrite and perlite is decreased, the ratio of ferrite having a lower hardness than perlite increases relatively. Therefore, when the material is used for a crankshaft, the strength of the overall crankshaft member becomes inadequate. As a result, the hardness of the hardened layer needs to be increased to increase the fatigue strength of the overall crankshaft member, causing the hardened layer to remain susceptible to cracking.

On the other hand, JP2007-197812A discloses a crankshaft steel comprising a two-phase structure of ferrite and perlite, capable of forming a soft-nitride layer that provides high fatigue strength to a crankshaft when used for a crankshaft despite its low level of hardness, by including predetermined amounts of Cu, Ni, and Cr, and a crankshaft member that uses the same. The invention makes it possible to achieve the same level of fatigue strength with a hardened layer having a lower level of hardness, thereby making it possible to further reduce crack occurrence.

As described above, through the bending correction process, any bends or warps is corrected by bending the crankshaft member in the direction opposite the direction of the bend. Therefore, a crankshaft member that makes it possible to perform a bending correction process without imparting excessive strain, i.e., a crankshaft member with superior bending correctability, is preferred. In contrast, such a crankshaft member with superior bending correctability suffers a decrease in fatigue strength, which requires providing a hardened layer having increased hardness by a surface hardening process, such as a soft-nitriding or nitriding process. As a result, cracks readily occur from the hardened layer, making the bending correction process difficult.

In JP2007-197812A as well, the bending correctability of the steel used in a crankshaft member that is not provided with a hardened layer is increased by increasing the ratio of the ferrite phase, resulting in the need to increase the hardness of the hardened layer to provide fatigue strength to the overall crankshaft member.

The present invention was made in view of such circumstances, and it is therefore an object of the present invention to provide a crankshaft member having both high fatigue strength and good bending correctability, that is made of a steel capable of increasing bending correctability without particularly decreasing the fatigue strength of the overall crankshaft member, reducing crack occurrence in the hardened layer, and enabling easy and reliable execution of a bending correction process, and a manufacturing method thereof.

SUMMARY OF THE INVENTION

The crankshaft member according to the present invention is a member made of steel consisting essentially of a two-phase structure of ferrite and perlite, wherein the steel includes C, Ni, Mn, and Cr as required elements and Si, Cu, Mo, Ti, V, Nb, Ca, and S as optional elements that may be included, in the amounts of C within the range of 0.20 to 0.50 wt %, Si within the range of 0 to 0.6 wt %, Mn within the range of 0.5 to 1.5 wt %, Cu within the range of 0 to 0.7 wt %, Ni within the range of 0.05 to 1.5 wt %, Cr within the range of 0.05 to 0.45 wt %, and Mo within the range of 0 to 0.5 wt % to satisfy the condition $115 \geq 70C+8Si+23Mn+11Cu+128Cr+83Mo \geq 50$; at least a portion of the surface is provided with a hard nitride layer having an average hardness within the range of 300 to 450 HV; and lamellar spacing of the perlite is 0.3 µm or less.

According to the invention, during a bending correction process capable of imparting a relatively slow strain rate, the bending correction process can be reliably performed on a crankshaft member that is not provided with a hard nitride layer as a result of the two-phase structure of perlite and ferrite, which exists without a decrease in its relative amount, without particularly imparting excessive strain due to ferrite ductility. That is, superior bending correctability is achieved. Further, a predetermined amount of Ni imparts ductility to the perlite grain having the narrow lamellar spacing of 0.3 µm or less in the hard nitride layer under the condition of slow strain rate that may be achieved during such an above-described bending correction process, thereby making it possible to prevent the layer from becoming the origin of a crack.

Therefore, the bending correction process can be easily performed without causing a crack to occur in the hardened layer. On the other hand, when the steel material is used for a crankshaft that is subjected to cyclic stress at a relatively high frequency, the hard nitride layer having an average hardness within the range of 300 to 450 HV imparts high fatigue strength to the overall crankshaft member, and the perlite having a high level of hardness with lamellar spacing of 0.3 µm or less provides high fatigue strength even in the portion that is not provided with a hard nitride layer. That is, the present invention enables to achieve a crankshaft member having high fatigue strength. Further, as an additional advantage, by verifying whether or not the lamellar spacing of the perlite is within a predetermined range, it is possible to assess whether or not the fatigue strength of the product is acceptable, thereby enabling easier control of the manufacturing process and making it possible to reduce manufacturing costs.

Further, in the above-described invention, the hard nitride layer may be imparted by a soft-nitriding process. According to the invention, it is possible to provide a perlite grain having higher ductility to the hard nitride layer, and during the bending correction process, the hard nitride layer cracking can be prevented, thereby enabling easy bending correction. At the same time, higher fatigue strength can be achieved for use as a crankshaft.

Further, in the above-described invention, the optional elements may include S within the range of 0.01 to 0.2 wt %. According to the invention, the predetermined amount of S can increase machinability. That is, the predetermined amount of S enables easy machining during the cutting process and further reduce crack occurrence in the hardened layer during machining.

Further, in the above-described invention, the optional elements may include at least one or more of Ti, V, Nb and Ca, Ti in an amount of 0.1 wt % or less, V in an amount of 0.1 wt % or less by weight, Nb in an amount of 0.1 wt % or less by weight and Ca in an amount of 0.005 wt % or less. According to the invention, it is possible to improve the yield strength and/or machinability of the steel of the crankshaft member without reducing its high fatigue strength or superior bending correctability.

Further, in the above-described invention, unavoidable impurity elements may include P in amounts of 0.035 wt % or less and O in the amounts of 0.01 wt % or less, respectively. According to the invention, it is possible to prevent a reduction in toughness.

Furthermore, the manufacturing method according to the present invention of a crankshaft member such as described above may comprise the steps of hot forging the steel into a predetermined shape at an austenite single-phase region temperature, continuously cooling the steel to obtain a two-phase structure of ferrite and perlite having lamellar spacing of the perlite of 0.3 µm or less, and soft-nitriding at least a portion of the steel to provide a hard nitride layer having an average hardness of the surface thereof within the range of 300 to 450 HV.

According to the invention, it is possible to achieve a crankshaft member having high fatigue strength. Further, by verifying whether or not the lamellar spacing of the perlite is within the predetermined range, it is possible to assess whether or not the fatigue strength of the product is acceptable, thereby enabling easier control of the manufacturing process and making it possible to reduce manufacturing costs.

Further, in the above-described invention, the hot forging may be performed at a temperature of 1050 degrees Celsius or higher. According to the invention, hot forging can be performed while completely dissolving the precipitates, thereby preventing forging cracks and making it possible to obtain a good product.

Further, in the above-described invention, the continuous cooling may be performed at a cooling rate of 0.3 to 20 degrees Celsius per second, particularly the steel being cooled from 800 degrees Celsius to 450 degrees Celsius. According to the invention, it is possible to reliably obtain perlite having a narrow lamellar spacing of 0.3 µm or less in the steel of the above-described component composition.

DESCRIPTION OF THE PREFERRED EMBODIMENTS

Prior to obtaining a crankshaft disclosed in the description of the preferred embodiments of the present invention, empirical experiments such as the following were performed. The empirical experiments are described below with reference to accompanying drawings.

Figure 1:
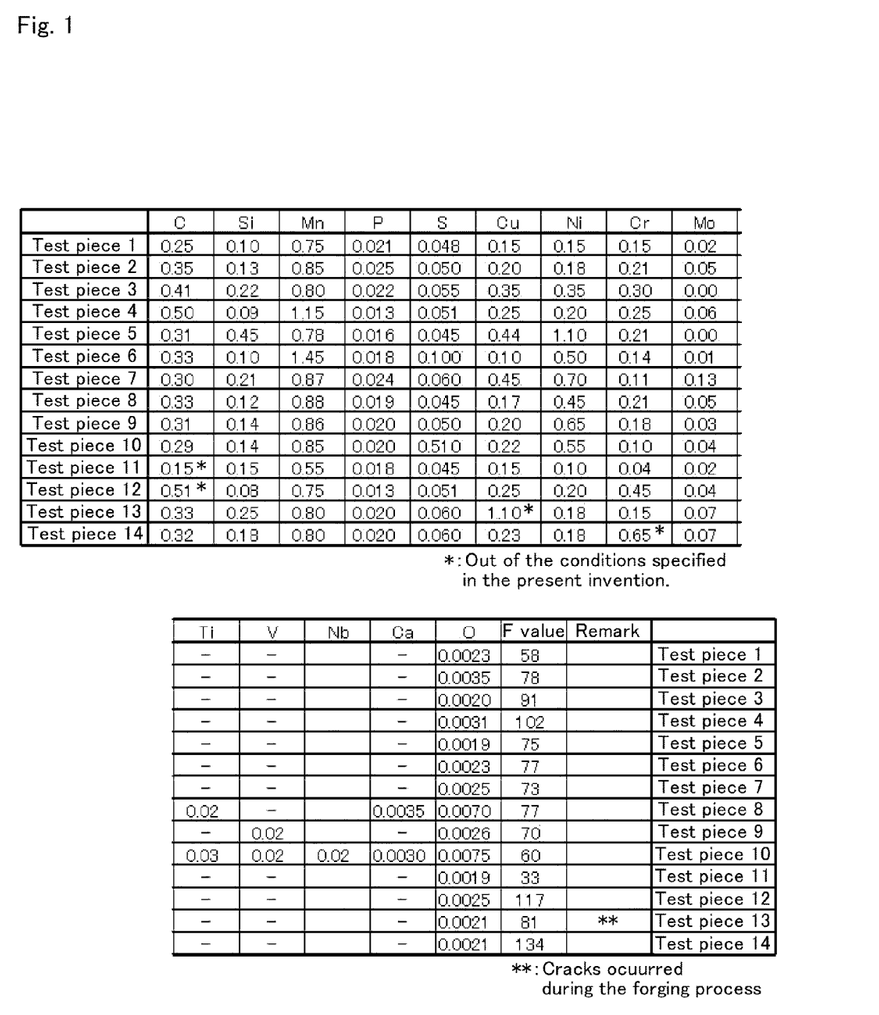
FIG. 1 is a table of component compositions of crankshaft members of the present invention (test pieces 1 to 10) and comparative examples (test pieces 11 to 14)

Steel comprising the components shown in FIG. 1 was melted and steel-made in a high-frequency induction furnace to obtain an ingot for test pieces 1 to 14. Each ingot was coarsely forged to a square having a cross-section of 70 square millimeters, and then hot forge to a size having a cross-section of 40 square millimeters, after reheating thereof for a period of 90 minutes at 1200 degrees Celsius. The forged square rod was then continually cooled by air blast to cool the rod, particularly the rod being cooled from 800 to 450 degrees Celsius at a cooling rate of approximately 1.0 degree Celsius per second. Additionally, from the ingot for test piece 2, a plurality of forged square rods were prepared and cooled by different cooling methods, which are air blast, mist, oil cooling, and water-cooling, so that each rod was cooled at a different cooling rate between 0.2 and 25.0 degrees Celsius per second to obtain square rods for test pieces 2-1 to 2-6.

Figure 2:
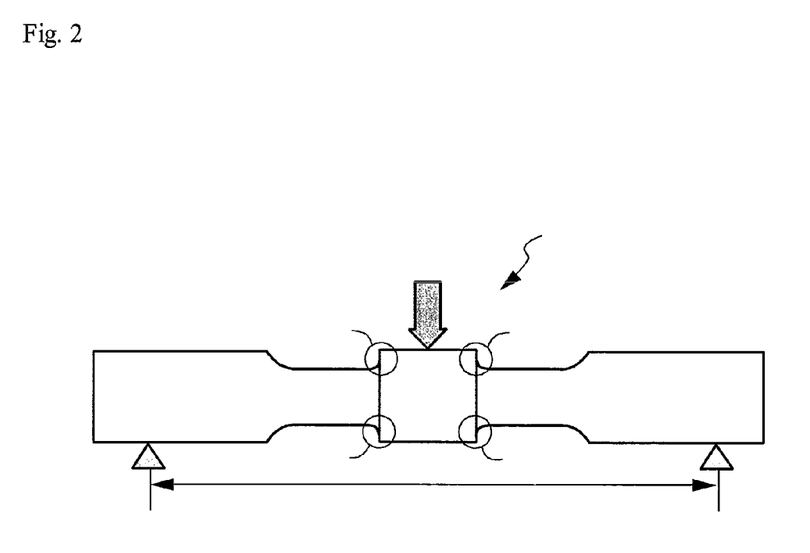
FIG. 2 is a plane view of a round rod test piece.

The cooled square rods for test pieces 1 to 14 and square rod test pieces 2-1 to 2-6 were machined to 210 mm long test pieces. FIG. 2 shows their shape as round rod 1. Each round rod test piece 1 was subjected to a gas soft-nitriding process for 1.5 hours at 580 degrees Celsius (gas flow ratio NH3: RX=1:1), and then quenched in an 80 degrees Celsius oil bath. The test pieces 1 to 14 and 2-1 to 2-6 obtained after gas soft-nitriding were provided for fatigue testing, hardness measurement, perlite lamellar spacing measurement, and bending correctability testing.

The fatigue test was carried out using an Ono-type rotating-bending fatigue test machine, under the test conditions of a test rotation speed of 3,000 rpm, a stress ratio of −1, and room temperature. The fatigue limit was obtained by repeating the test $10^7$ cycles.

The hardness test was carried out using a Vickers hardness tester. The rod test piece 1 was cut at a curved portion 5 shown in FIG. 2 to reveal a cross section. The hardness was measured by pressing the indenter at a load of 300 grams at a position of 0.05 mm from the surface.

The perlite lamellar spacing was measured from a SEM (scanning electron microscope) image. The test piece used in the hardness test was molded and polished. And then, the polished surface is etched by picral to observe a two-phase structure of ferrite and perlite by SEM.

The bending correction test was carried out by a 3-points bending test. A test piece is mounted on two supports having a span W of 182 mm, as schematically shown in FIG. 2. A load provides to the center of the test piece in direction to supports at a rate of 4 mm per minute. It is measured a displacement d (mm) in the center of the test piece up to a crack initiation. In general, initiation cracks is generated at the curved portion 5, "stress concentration portion", in the shape such as the round rod test piece 1. Bending correctability is defined as the displacement d.

Figure 3:
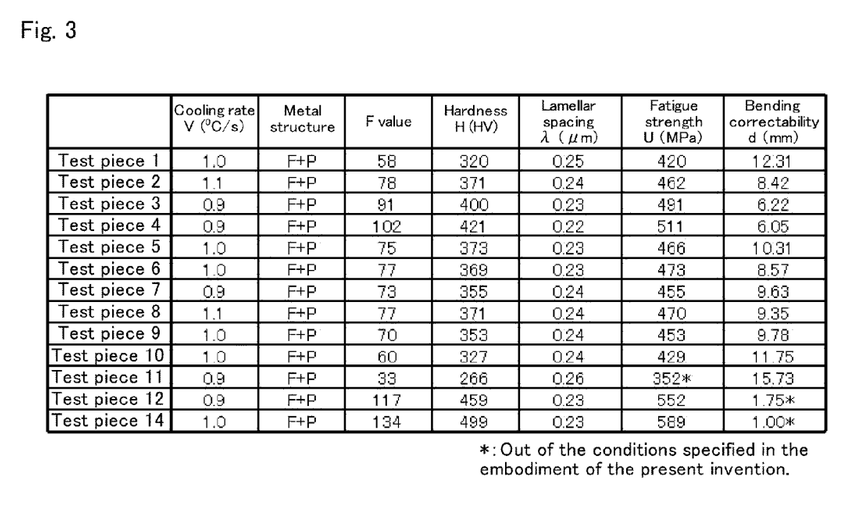
FIG. 3 is a table of each test result of the test pieces having the component compositions of the crankshaft members of the present invention (test pieces 1 to 10) and comparative examples (test pieces 11, 12, and 14)

First, test pieces 1 to 14 made of steel comprising the components shown in FIG. 1, each comprised a two-phase structure of ferrite and perlite as shown in FIG. 3. The lamellar spacing λ (μm) of the perlite layer was within the range of 0.22 to 0.26 μm, and was substantially the same in each piece.

Figure 4:
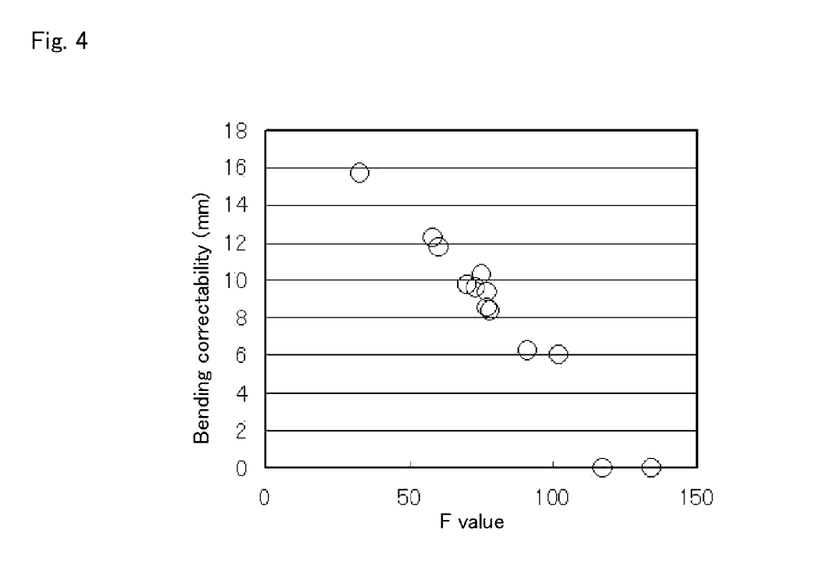
FIG. 4 is a graph of the test results of the test pieces having the component compositions of the crankshaft members of the present invention (test pieces 1 to 10) and comparative examples (test pieces 11, 12, and 14)
Figure 5:
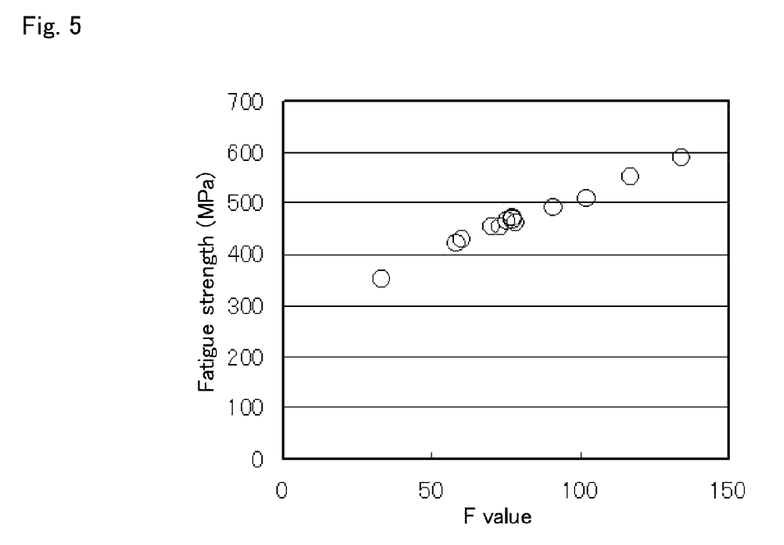
FIG. 5 is a graph of the test results of the test pieces having the component compositions of the crankshaft members of the present invention (test pieces 1 to 10) and comparative examples (test pieces 11, 12, and 14)

The F value can be empirically defined as F=70C+8Si+ 23MN+11Cu+128Cr+83Mo related to the amounts of C, Si, Mn, Cu, Cr, and Mo, and these are listed in FIG. 3. The F values are plotted on a horizontal axis and bending correctability d (mm) are plotted on a vertical axis as shown in FIG. 4. The resultant line is substantially linear and monotonically decreasing. As understood from this result, very little pressing, i.e., very little bending correctability is achieved at an F value of 115 or greater. Further, as shown in FIG. 5, the F values are plotted on a horizontal axis and fatigue strength U (MPa) are plotted on a vertical axis. The resultant line is substantially linear and monotonically increasing when viewed within a certain range. As understood from this result, when the F value is less than 50, the fatigue strength becomes insufficient, falling below 400 MPa. Therefore, the preferred F value range is understood to be greater than or equal to 50 and less than 115.

Figure 6:
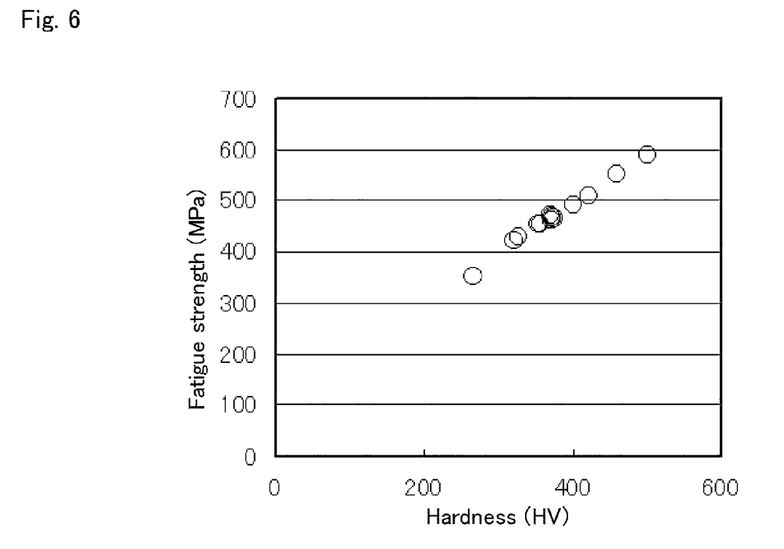
FIG. 6 is a graph of the test results of the test pieces having the component compositions of the crankshaft members of the present invention (test pieces 1 to 10) and comparative examples (test pieces 11, 12, and 14)
Figure 7:
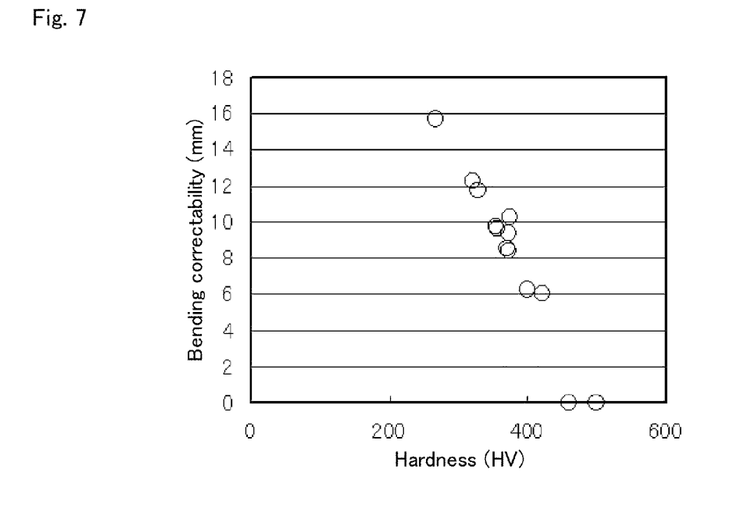
FIG. 7 is a graph of the test results of the test pieces having the component compositions of the crankshaft members of the present invention (test pieces 1 to 10) and comparative examples (test pieces 11, 12, and 14)

Further, using the values of FIG. 3, hardness H (HV) are plotted on a horizontal axis and fatigue strength U (MPa) are plotted on a vertical axis as shown in FIG. 6. The resultant line is substantially linear and monotonically increasing when viewed within a certain range. As understood from this result, when the hardness is less than approximately 300 HV, the fatigue strength becomes insufficient, falling below 400 MPa. Further, hardness H (HV) are plotted on a horizontal axis and bending correctability d (mm) are placed on a vertical axis as shown in FIG. 7. The resultant line is substantially linear and monotonically decreasing. As understood from this result, very little pressing, i.e., very little bending correctability is achieved at a hardness of 450 HV or greater. Based on this result, a hardness of 300 to 450 HV is preferred.

Figure 8:
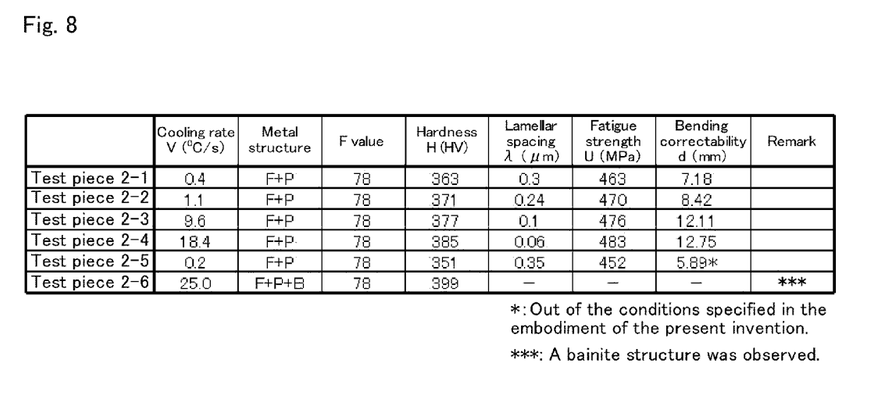
FIG. 8 is a graph of the test results of the test pieces having the component compositions of the crankshaft members of the present invention (test pieces 2-1 to 2-4) and comparative examples (test pieces 2-5 and 2-6)

Next, test pieces 2-1 to 2-6 in the same composition were cooled at various cooling rates V to observe the metal structure. These results are shown in FIG. 8. A bainite structure was partially observed in the test piece 2-6 at the fastest cooling rate. In the other test pieces 2-1 to 2-5, a two-phase structure of ferrite and perlite was observed and substantially same hardness and fatigue strength were represented.

Figure 9:
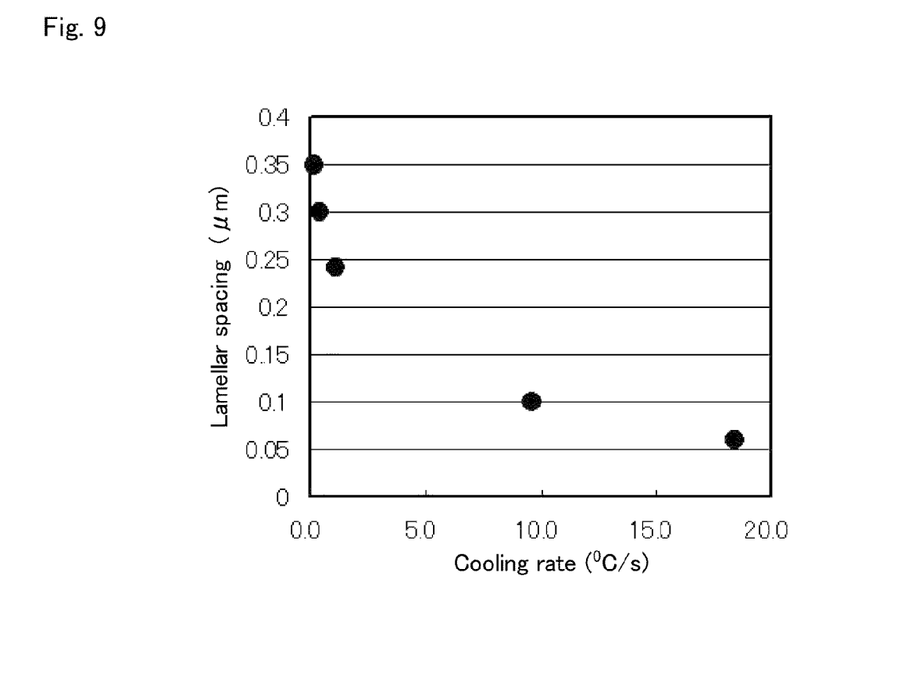
FIG. 9 is a graph of the test results of the test pieces having the component compositions of the crankshaft members of the present invention (test pieces 2-1 to 2-4) and comparative examples (test pieces 2-5 and 2-6)
Figure 10:
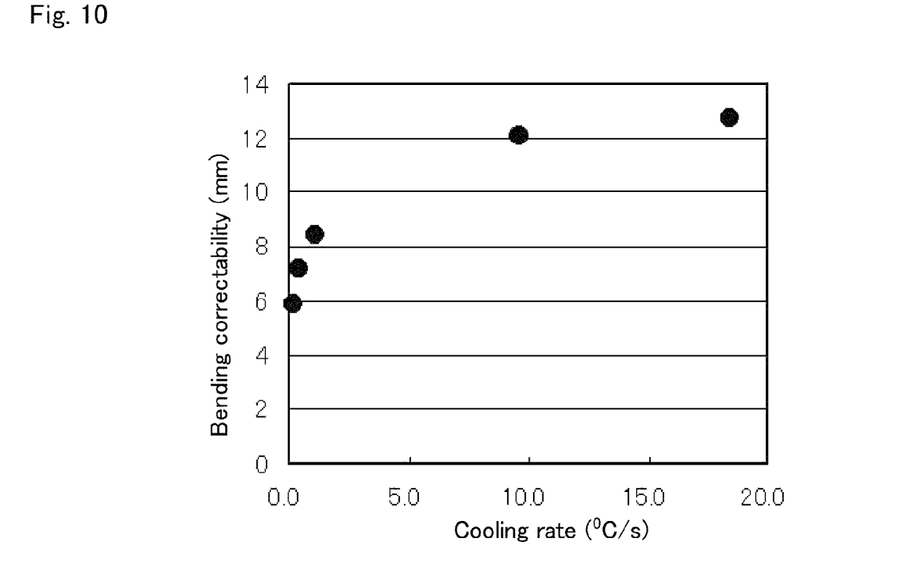
FIG. 10 is a graph of the test results of the test pieces having the component compositions of the crankshaft members of the present invention (test pieces 2-1 to 2-4) and comparative examples (test pieces 2-5 and 2-6)

The cooling rate V (degrees Celsius per second) are plotted on a horizontal axis and the lamellar spacing λ (μm) of the perlite structure are plotted on a vertical axis for the test pieces 2-1 to 2-5 as shown in FIG. 9. The lamellar spacing λ suddenly becomes wider below the boundary of a 0.3 degree Celsius per second cooling rate. Furthermore, as shown in FIG. 10, the cooling rate V (degree Celsius per second) are plotted on a horizontal axis and bending correctability data (mm) are placed on a vertical axis. The bending correctability suddenly decreases below the boundary of a 0.3 degree Celsius per second cooling rate. Therefore, the steel is preferably cooled at 0.3 to 20 degrees Celsius per second when cooled from 800 degrees Celsius to 450 degrees Celsius. That is, at such a cooling rate, the lamellar spacing λ of the perlite is decreased while the ductility in the bending correction process is increased and the perlite amount is increased, as described later. On the other hand, when the cooling rate is excessively high, bainite structure is formed and thermal strain readily occurs.

In the above description, the guidelines for obtaining the range of each component indicated in FIG. 1 are described below.

The C amount is preferably 0.2 to 0.5 wt % to improve the strength of the steel, more preferably 0.3 to 0.5 wt % to relatively increase the perlite amount.

Ni improves the ductility of perlite in the nitride layer and improves bending correctability. On the other hand, when Ni is added excessively, machinability decreases. Therefore, the Ni amount is preferably 0.05 to 1.0 wt %, more preferably 0.10 to 1.0 wt %.

Mn improves the yield strength of the steel, and produces an Mn sulfide when combined with S, thereby making it possible to improve machinability. Therefore, the amount included is preferably 0.5 to 1.5 wt %.

Cr increases the strength and toughness of the steel, making it possible to improve fatigue strength. Therefore, the amount is preferably 0.05 to 0.45 wt %, more preferably 0.06 to 0.3 wt % to ensure that the hardness of the nitride layer does not increase excessively, causing a decrease in bending correctability.

Si, Cu, Mo, Ti, V, Nb, Ca, S, and the like may be optionally included based on the purpose of element addition.

Si improves fatigue strength and functions as a deoxidizing agent during steel making. On the other hand, when Si is added excessively, bending correctability deteriorates. Therefore, the amount is preferably 0.6 wt % or less, more preferably 0.05 to 0.4 wt % from the viewpoint of stabilizing control in the soft-nitriding or nitriding process.

Cu improves the yield strength of steel, making it possible to increase strength. On the other hand, when Cu is added excessively, hot workability deteriorates. Therefore, the amount is preferably 0.5 wt % or less, more preferably 0.1 to 0.5 wt % from the viewpoint of fatigue strength improvement.

Mo can improve the strength of the steel, but deteriorates machinability when added excessively. Therefore, the amount is preferably 0.3 wt % or less.

Ti forms a fine oxide and acts as the nucleus of the above-described Mn sulfide. On the other hand, when added in excess, Ti excessively increases the hardness of the nitride layer. Therefore, to prevent deterioration of bending correctability, the amount is preferably 0.05 wt % or less by weight.

V can improve yield strength, but excessively increases the hardness of the nitride layer when added in excess. Therefore, to prevent deterioration of bending correctability, the amount is preferably 0.03 wt % or less.

Nb can improve yield strength, but excessively increases the hardness of the nitride layer when added in excess. Therefore, to prevent deterioration of bending correctability, the amount is preferably 0.03 wt % or less.

Ca can improve machinability, but produces CaS and conversely deteriorates machinability when added excessively. Therefore, the amount is preferably 0.005 wt % or less.

S produces Mn sulfide as described above, making it possible to improve machinability. When added excessively, however, cracks may readily occur as a result of hot forging. Therefore, the amount is preferably 0.01 to 0.15 wt %.

Note that the impurities that may be unavoidably included during manufacturing are preferably restricted as follows. That is, when the amount of P exceeds 0.035 wt %, toughness may deteriorate. Therefore, the amount is preferably 0.035 wt % or less. Similarly, the amount of O is preferably 0.01 wt % or less.

From the empirical experiments such as described above, a crankshaft member 10 as shown in FIG. 11 was manufactured, according to an embodiment of the present invention. That is, the crankshaft 10 comprises a portion 14 representing the journal portion that rotates around a rotating axis X (in dot-and-dash line), a portion 12 representing the arm provided at a predetermined interval along the rotating axis X and formed to protrude sideways, and a portion 16 representing the pin portion of the protruding end portion of the arm portion connected via a pin to a connecting rod that connects with a piston.

Such crankshaft 10 were manufactured using steel having compositions shown in test pieces 1 to 10 of FIG. 1 and subjecting the steel to a hot forging process, cooling process, soft-nitriding process, and bending correction process such as described above. The soft-nitriding process introduces ammonia gas in an atmosphere where the temperature of each steel type is $A_1$ temperature or less, i.e., a temperature of about 550 to 660 degrees Celsius, for example, and diffuses the nitrogen from the surface of the steel toward the steel interior, thereby forming nitride near the surface and providing a hardened layer.

According to the embodiment, it was confirmed that it is possible to improve bending correctability while lessening crack occurrence in the hardened layer and easily and reliably executing bending correction, without decreasing the fatigue strength of the overall crankshaft member 10, in particular. It was also confirmed that such crankshaft member 10 achieves high fatigue strength.

Thus the present inventors arrived at the present invention upon focusing on the differences between the mechanical conditions imparted to the crankshaft member during bending correction and the mechanical conditions during use as a crankshaft. That is, while the former makes it possible to demand ductility in the crankshaft member in response to the strain that may be imparted at a relatively slow rate since the deformation rate may be arbitrarily changed, the latter demands deformation resistance in the crankshaft member in response to the high-frequency varying stress during actual use.

While the above has described representative embodiments of the present invention and modifications based thereon, the present invention is not limited thereto and suitable modifications can be made by those skilled in the art. It will be apparent to those skilled in the art that various modifications can be made in the present invention without departing from the spirit or scope of the present invention.

What is claimed is:

1. A manufacturing method of a crankshaft member, comprising the steps of:

hot forging steel into a pre-crankshaft member's shape at an austenite single-phase region temperature, wherein said steel includes C, Ni, Mn, and Cr as required elements and Si, Cu, Mo, Ti, V, Nb, Ca and S as optional elements that may be included, in the amounts by weight of, C within the range of 0.20 to 0.50%,
Si within the range of 0 to 0.6%,
Mn within the range of 0.5 to 1.5%,
S within the range of 0 to 0.10%,
Cu within the range of 0 to 0.7%,
Ni within the range of 0.05 to 1.5%,
Cr within the range of 0.05 to 0.45%, and
Mo within the range of 0 to 0.5%,
to satisfy the condition 115≥70C+8Si+23Mn+11Cu+128Cr+83Mo>50;

continuously cooling said steel at a cooling rate of 9.6 to 20 degrees Celsius per second from 800 degrees Celsius to 450 degrees Celsius by air blast, mist, oil cooling, or water-cooling so as to obtain a two-phase structure of ferrite and perlite having lamellar spacing of the perlite of 0.3 μm or less, and nitriding at least a portion of said steel to provide a hard nitride layer having an average hardness of the surface thereof within the range of 300 to 450HV.

2. The manufacturing method of the crankshaft member according to claim 1, wherein said nitriding is imparted by a soft-nitriding process.

3. The manufacturing method of the crankshaft member according to claim 1, wherein said optional elements include S within the range of 0.01 to 0.10% by weight.

4. The manufacturing method of the crankshaft member according to claim 2, wherein said optional elements include S within the range of 0.01 to 0.10% by weight.

5. The manufacturing method of the crankshaft member according to claim 1, wherein said optional elements include at least one or more of Ti, V, Nb and Ca, Ti in an amount of 0.1% or less by weight, V in an amount of 0.1% or less by weight, Nb in an amount of 0.1% or less by weight and Ca in an amount of 0.005% or less by weight.

6. The manufacturing method of the crankshaft member according to claim 2, wherein said optional elements include at least one or more of Ti, V, Nb and Ca, Ti in an amount of 0.1% or less by weight, V in an amount of 0.1% or less by weight, Nb in an amount of 0.1% or less by weight and Ca in an amount of 0.005% or less by weight.

7. The manufacturing method of the crankshaft member according to claim 3, wherein said optional elements include at least one or more of Ti, V, Nb and Ca, Ti in an amount of 0.1% or less by weight, V in an amount of 0.1% or less by weight, Nb in an amount of 0.1% or less by weight and Ca in an amount of 0.005% or less by weight.

8. The manufacturing method of the crankshaft member according to claim 1, wherein unavoidable impurity elements include P in amounts of 0.035% or less and O in the amounts of 0.01% or less by weight, respectively.

9. The manufacturing method of the crankshaft member according to claim 3, wherein unavoidable impurity elements include P in amounts of 0.035% or less and O in the amounts of 0.01% or less by weight, respectively.

\* \* \* \* \*

UNITED STATES PATENT AND TRADEMARK OFFICE
CERTIFICATE OF CORRECTION

Page 1 of 1

PATENT NO. : 8,685,177 B2
APPLICATION NO. : 12/630536
DATED : April 1, 2014
INVENTOR(S) : Isamu Saito et al.

It is certified that error appears in the above-identified patent and that said Letters Patent is hereby corrected as shown below:

IN THE DRAWINGS:

In Sheet 2 of 7, replace Fig. 2 with the following corrected figure:

Fig. 2

Figure 11:
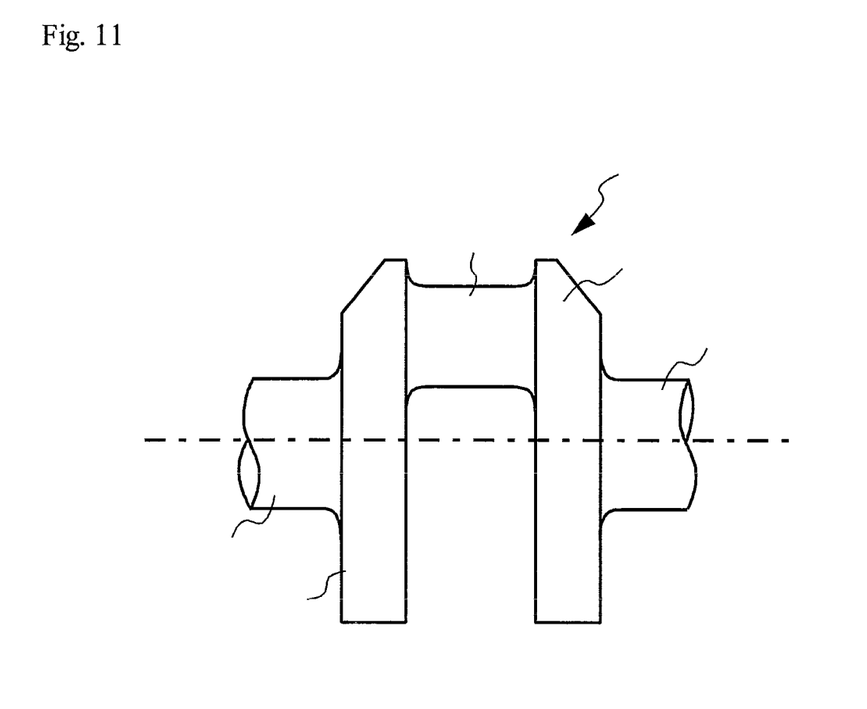
FIG. 11 is a plane view of the crankshaft member of the present invention.

In Sheet 7 of 7, replace Fig. 11 with the following corrected figure:

Fig. 11

Signed and Sealed this
Twenty-second Day of July, 2014

Michelle K. Lee
*Deputy Director of the United States Patent and Trademark Office*